(12) United States Patent
DiMaggio (10) Patent No.: US 7,827,733 B2
(45) Date of Patent: Nov. 9, 2010

(54) MOBILE GARDEN CART

(76) Inventor: Angela DiMaggio, 2318 E. Huron Ct., Gilbert, AZ (US) 85234-3816

( * ) Notice: Subject to any disclaimer, the term of this patent is extended or adjusted under 35 U.S.C. 154(b) by 0 days.

(21) Appl. No.: 12/321,179

(22) Filed: Jan. 15, 2009

(65) Prior Publication Data

US 2009/0183427 A1   Jul. 23, 2009

Related U.S. Application Data

(60) Provisional application No. 61/011,812, filed on Jan. 22, 2008.

(51) Int. Cl.
A47G 7/00 (2006.01)
(52) U.S. Cl. .......................................................... 47/39
(58) Field of Classification Search ...................... 47/39
See application file for complete search history.

(56) References Cited

U.S. PATENT DOCUMENTS

| | | | | |
|---|---|---|---|---|
| 129,382 A | * | 7/1872 | Reimer | 148/323 |
| 320,362 A | * | 6/1885 | Judd | 108/59 |
| D21,044 S | * | 9/1891 | Peters | D6/306 |
| D23,906 S | * | 12/1894 | Symonds | D6/405 |
| 875,235 A | | 12/1907 | Bastel | |
| 2,777,584 A | * | 1/1957 | Dobrin et al. | 108/148 |
| 3,365,840 A | | 1/1968 | Cooper | |
| 4,380,136 A | * | 4/1983 | Karpisek | 47/83 |
| 4,608,776 A | | 9/1986 | Kooy | |
| 4,896,456 A | * | 1/1990 | Grant | 47/67 |
| 4,899,487 A | | 2/1990 | Brownlee | |
| 5,044,118 A | | 9/1991 | Ferris | |
| 5,095,649 A | | 3/1992 | Brownlee | |
| 5,095,653 A | | 3/1992 | Guldberg | |
| 5,367,823 A | * | 11/1994 | Ferris | 47/39 |
| 5,570,540 A | | 11/1996 | Womack et al. | |
| D403,268 S | | 12/1998 | Dignam | |
| 6,402,167 B1 | | 6/2002 | Calleja | |
| 6,932,363 B2 | | 8/2005 | D'Angelo | |

FOREIGN PATENT DOCUMENTS

| | | |
|---|---|---|
| DE | 3835787 A1 | 4/1990 |
| FR | 2568448 A1 * | 2/1986 |
| WO | WO 2005/042332 A1 | 5/2005 |

* cited by examiner

*Primary Examiner*—Francis T Palo
(74) *Attorney, Agent, or Firm*—The Halvorson Law Firm (57) ABSTRACT

A kit for a mobile gardening cart that includes the following: a base structure, storage areas, and a plurality of wheels to allow it to pivot in any directions, an upright frame structure with reasonable braced support, linage/connection to a main vertical frame, and multiple stackable container forms to be placed parallel to each other in an ascending upward fashion on the upright frame structure.

6 Claims, 8 Drawing Sheets

MOBILE GARDEN CART

This application is a continuation in part of U.S. Provisional patent application 61/011,812 filed on Jan. 22, 2008.

FIELD OF THE INVENTION

The present invention relates to the field of gardening. More specifically, the present invention relates to the field of mobile garden carts.

BACKGROUND

The present invention relates to gardening carts for the plant or garden hobbyist or horticulturist. An urban gardener frequently is limited in space for plants because of the conventional utilization of living space around the house or apartment. The urban gardener is faced with the choice of dedicating a portion of their living area to the gardening effort and loss of utility of the area or the pursuit of the hobby in full view of visitors. While the trappings of the gardener produce the beauty and joy of mature fruit and flowers, the present invention provides an attractive gardening area that is mobile and will complement the decor of the living space.

Moreover, the present invention provides both a decorative and attractive aspect to the gardening function. With the disclosed gardening cart, the structure may be readily assembled and utilized for the period necessary. The gardening cart may then be easily transported to another. While the structure is functional and sturdy, its the simplistic design and assembly provides an attractive help-mate to the gardener.

Further application of the present invention may be found in the portability of the gardening cart as used for early planting of vegetable seedlings. In such application, the seedling house may be set out of doors during the warmer, sunny days to encourage the germination and growth of the seeds. The cart is then readily returned indoors for the cool evenings or colder, dark days which could inhibit plant growth.

SUMMARY OF THE INVENTION

It is an object of the present invention to provide a kit and device for mobile gardening comprising a base structure, at least one vertical support attached to a rear end of the base structure, at least one diagonal support attached between a front end of the base structure and a top end of the vertical support, said diagonal support further comprising a plurality of bracket receiving slots; at least two growing containers, each growing container comprising at least a base and at least one side, capable of holding soil or other plant material, said base having at least one water drainage aperture; and at least two brackets attaching the at least two growing containers to the diagonal supports of the cart.

It is another object of the present invention to provide the kit and device for mobile gardening wherein the at least two growing containers are all the same size.

It is yet another object of the present invention to provide the kit and device for mobile gardening wherein the at least two growing containers are different sizes.

Reference now will be made in detail to various aspects of this invention, including the presently preferred embodiments. Each example is provided by way of explanation of embodiments of the invention, not limitation of the invention. In fact, it will be apparent to those skilled in the art that various modifications and variations can be made in the present invention without departing from the spirit or scope of the invention. For instance, features illustrated or described as part of one embodiment can be used on another embodiment to yield a still further embodiment. Thus, it is intended that the present invention cover such modifications and variations within the scope of the appended claims and their equivalents.

DETAILED DESCRIPTION

The present invention is useful for home gardening. Specifically, it is useful in that it allows relocation of home patio gardens as the user desires.

FIGS. 1 to 9 show an exemplary mobile garden cart 10 that is suitable for use as an upright terraced growing container system.

Figure 1:
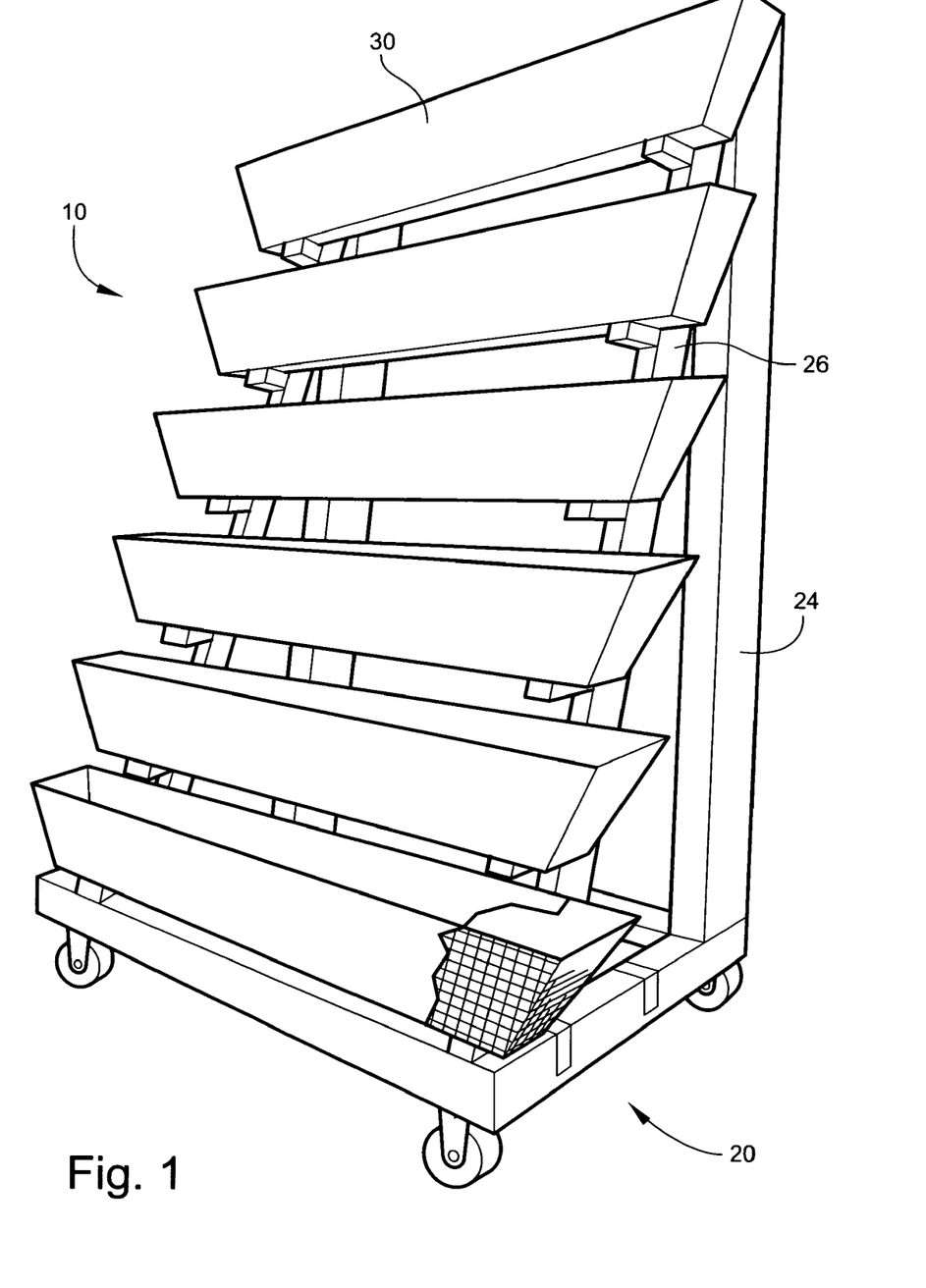
FIG. 1 shows a perspective view of one embodiment of the present invention.
Figure 2A:
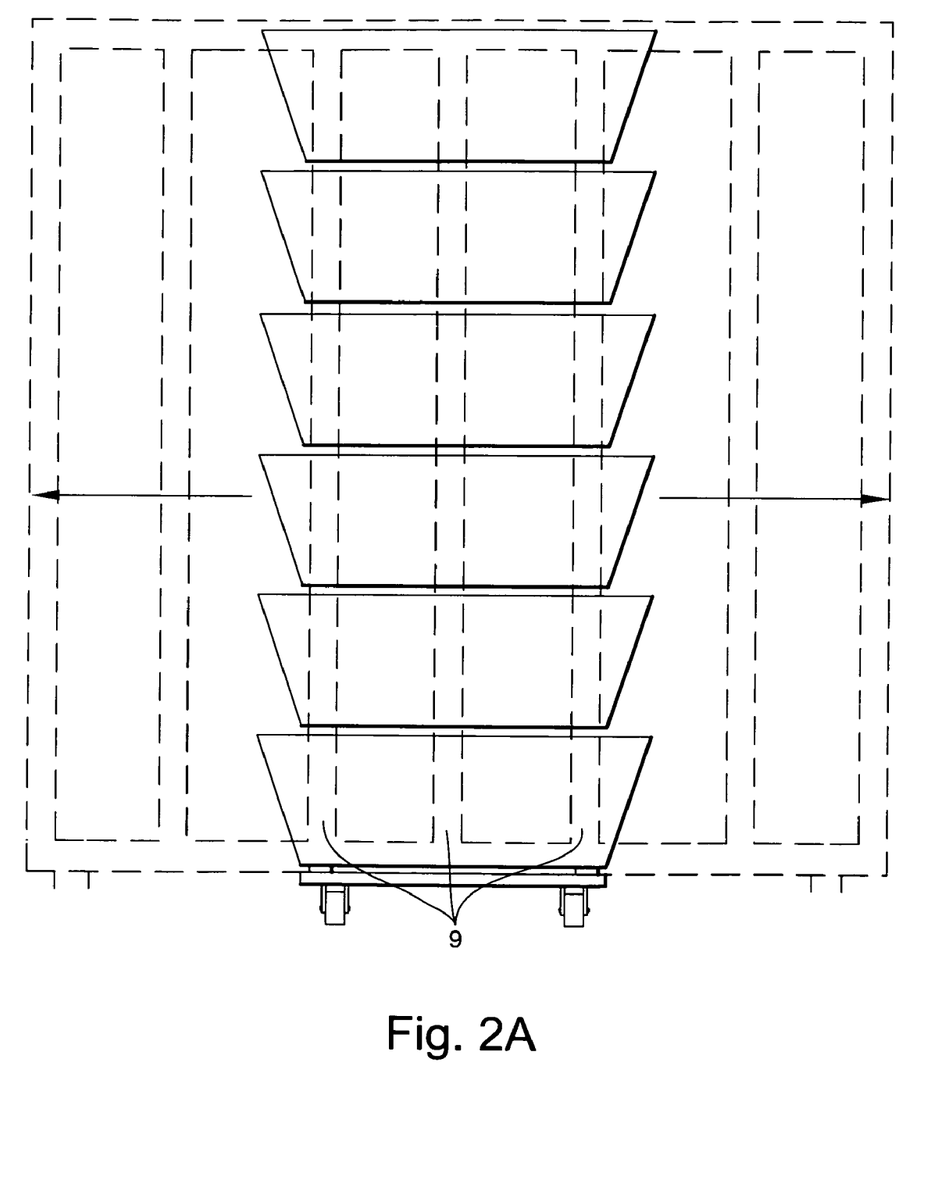
FIG. 2A shows a front view of one of the embodiment of the present invention.
Figure 3A:
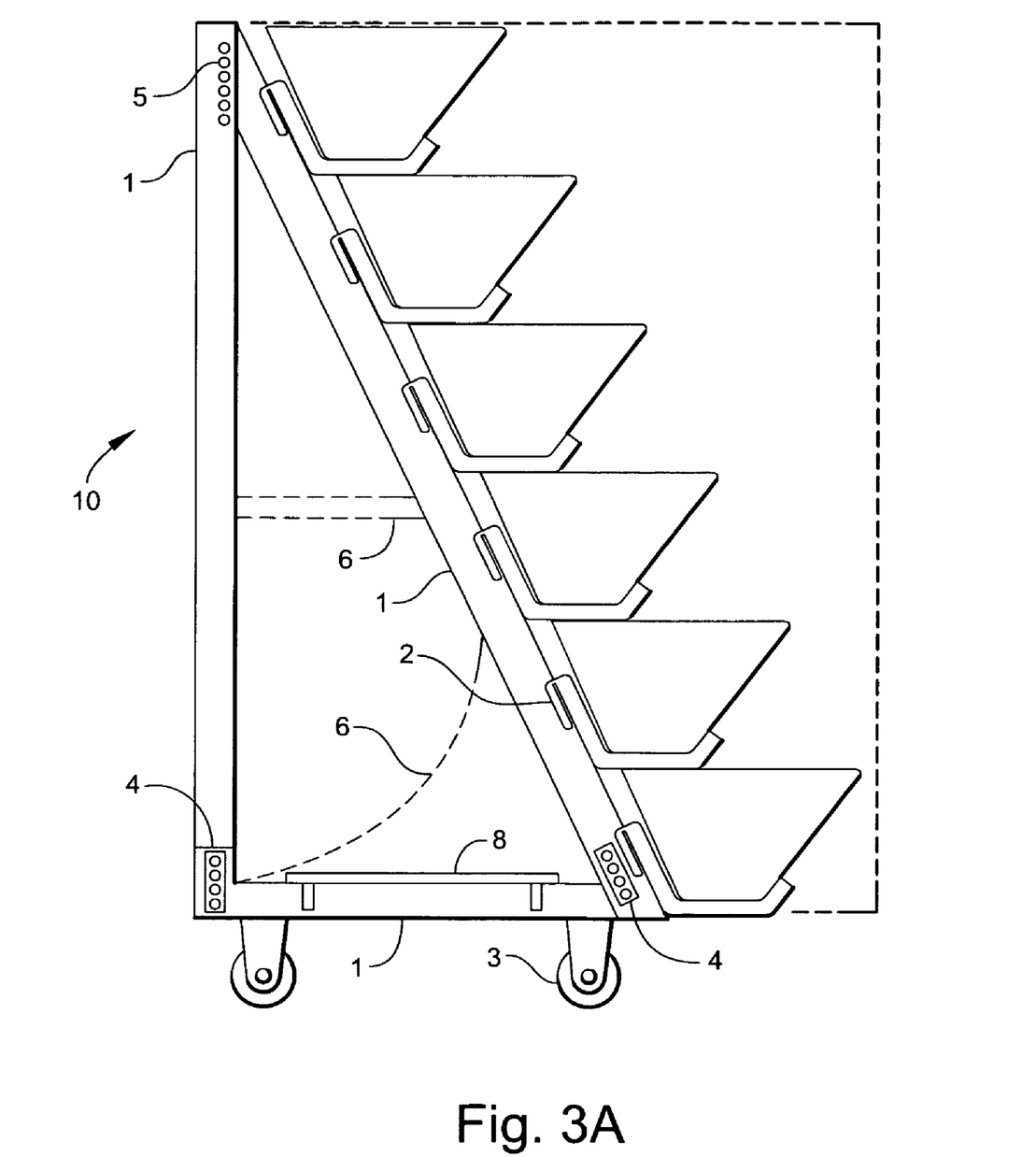
FIG. 3A shows a side view of one embodiment of the present invention.

The cart 10 according to the present invention comprises a base structure 20. One preferred base structure 20 is rectangular with four sides, two short sides and two long sides. Another preferred base structure 20 is trapezoidal with four sides, two angles sides, a short side, and a long side. Other shapes may be used and still fall within the scope of the present invention. The inside area of the base structure 20 is spanned by a tray, netting or mesh 21.

Figure 4A:
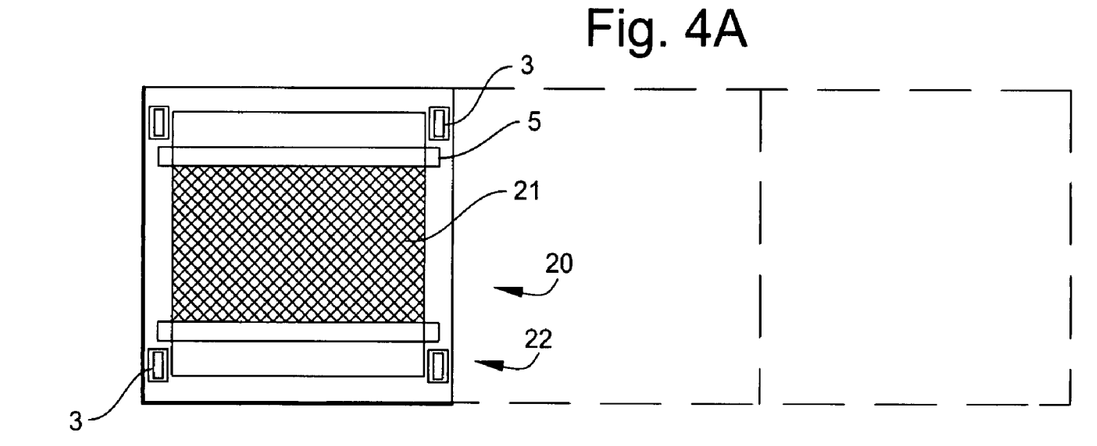
FIG. 4 shows a bottom view of one embodiment of the present invention. The broken lines illustrate various possible widths that may be adopted for this invention.
Figure 4B:
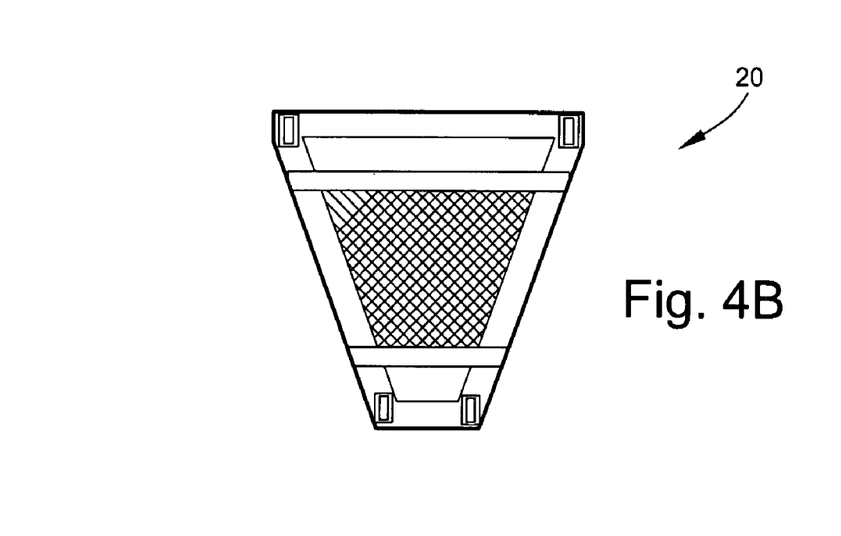

The base structure 20 is movable comprising at least one movement enabling structure 22. In one preferred embodiment the movement enabling structure 22 comprises four castered wheels. In another preferred embodiment, the movement enabling structure 22 comprises three castered wheels. In an alternate embodiment, the movement enabling structure 22 comprises four low friction slide pads. Other movement enabling structures may be useds and still fall within the scope of the present invention.

Attached to a rear to the rear of the base structure 20 is at least one vertical support 24. The vertical support 24 extends upward from a top surface of the rear of the base structure 20. In the preferred embodiment, there are two vertical supports 24, however, other numbers of vertical supports, such as one, three, etc. may be used and still fall within the scope of the instant invention.

Figure 10:
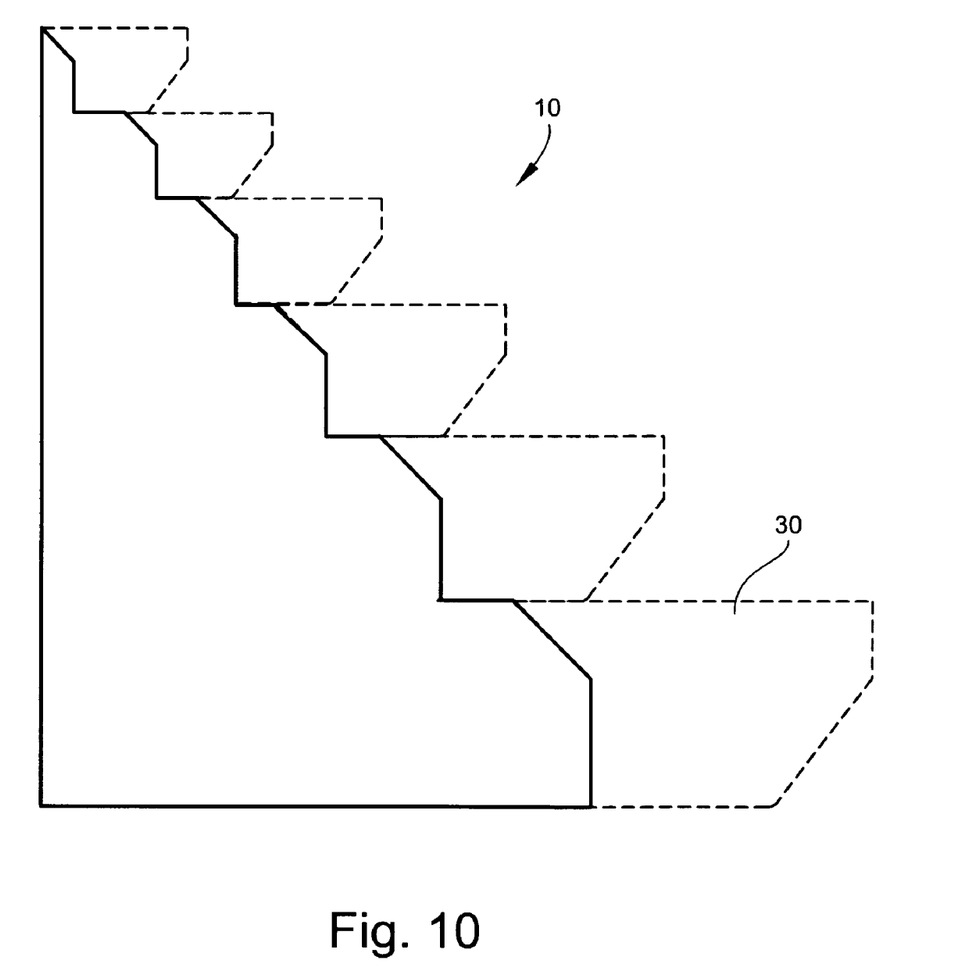
FIG. 10 shows a side view of an alternate embodiment of diagonal support structure configured to receive growing containers.

The cart 10 further comprises at least one diagonal support 26, which extends from the front of the base structure 20 to the top of the at least one vertical supports 24. Preferably there are the same number of diagonal supports 264 as vertical supports 24. Each diagonal support 26 further comprises a plurality of bracket receiving slots 27, shown in FIG. 7. Alternately, the diagonal supports 264, may include cut out sections that are configured to securely receive growing containers 30, shown in FIG. 10. This attachment may be by brackets, adhesives, notches and corresponding tangs and other like attachment structures and still fall within the scope of the present invention.

Attached in a tiered fashion to the diagonal supports 264 are at least two growing containers 30. Preferably the at least two growing containers 30 are symmetrically attached but asymmetrical attachment is considered. Critically, at least a portion of each growing container 30 is directly over the growing container below (with the exception of the bottom growing container). Thus, the angle of the diagonal support must be sufficient enough to place at least a portion of each growing container 30 over the one below.

Figures 5, 6:
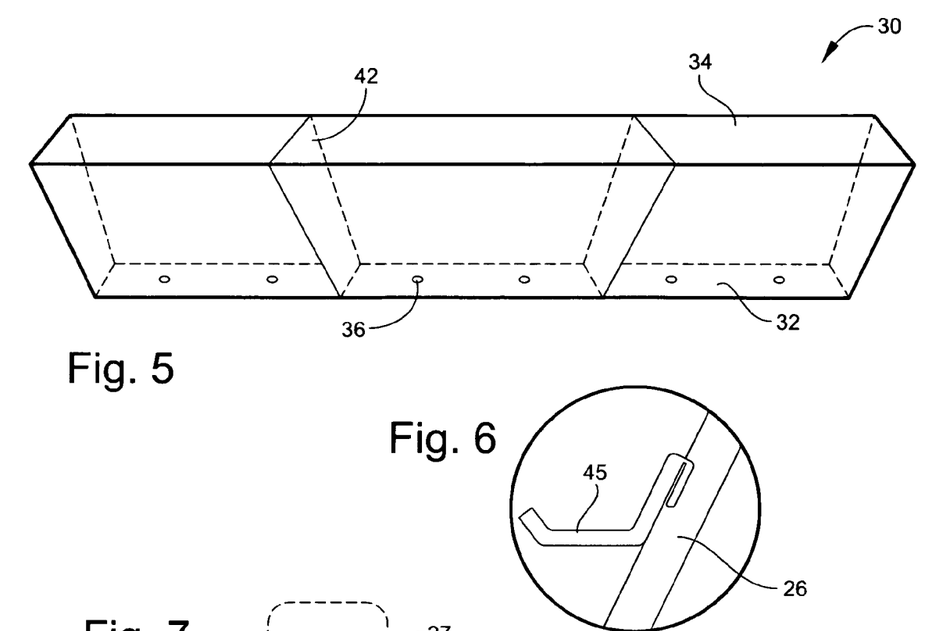
FIG. 5 shows a perspective of the front of one of the containers of the present invention illustrating drainage holes.
FIG. 6 shows a side view of a bracket attachment as it relates to the support frame of the present invention.
Figure 7:
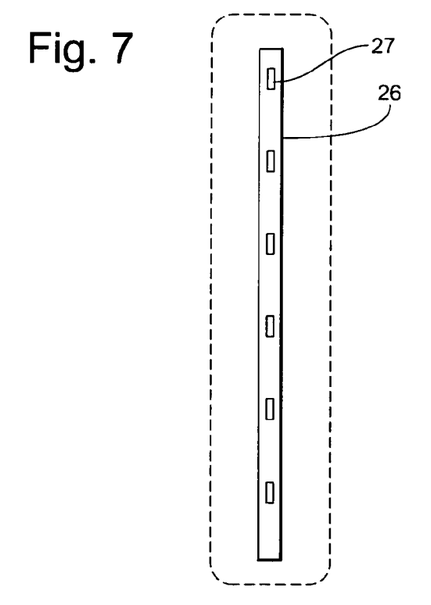
FIG. 7 shows a front view of a chassis support member with precut bracket attachment slots.
Figure 8:
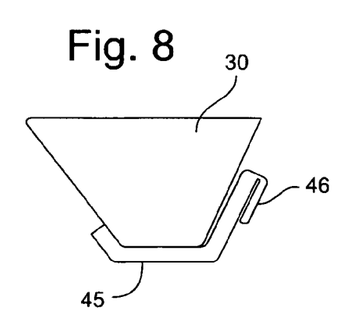
FIG. 8 shows a side view of a planter and bracket.
Figure 9:
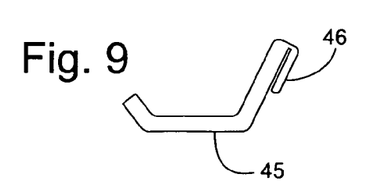
FIG. 9 shows a side view of a planter box attachment.

Each growing container 30 is attached to the diagonal supports 26 by at least one bracket 45, shown in FIGS. 6, 8 and 9. The preferred bracket 45 is generally J-shaped with the lower portion of the J-shape capable of receiving a growing container 30. The top of the J-shape further includes a tab 46 for receipt within the bracket receiving slots 27, thereby securing the J-shape of the bracket 45 to the diagonal support 26. Alternately, the diagonal supports 26 may have notches that receive the growing containers 30.

Each growing container 30 is capable of holding soil or other plant base matter. One preferred embodiment of growing container 30 has a base 32 with four non-vertical, outwardly angled sides 34. These growing containers 30 are sized to be stacked inside of each other when shipped in the disassembled state. Critically, each the base 32 of each growing container 30 further comprises at least one drainage aperture 36. These drainage apertures should be located that when water flows through them, the water is received by the growing container below (with the exception of the bottom growing container), thereby reducing water wastage.

Figure 2B:
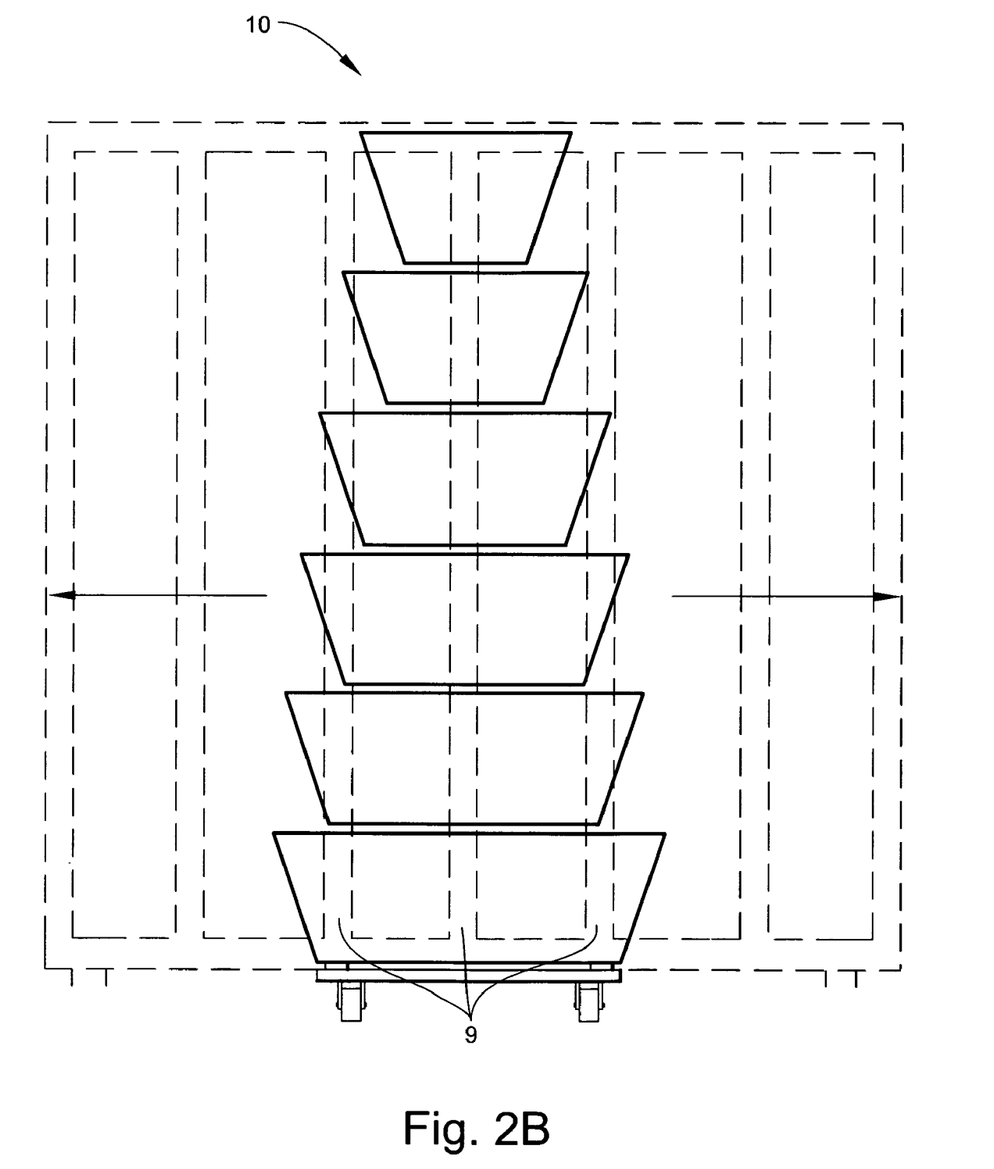
FIG. 2B shows a front view of an alternate embodiment of the present invention.

In an alternate embodiment, shown in FIG. 2B, the at least two growing containers 30 may be of descending sizes such that each successive descending growing container is significantly longer that the one above. These growing containers 30 are sized to be stacked inside of each other when shipped in the disassembled state.

Figure 3B:
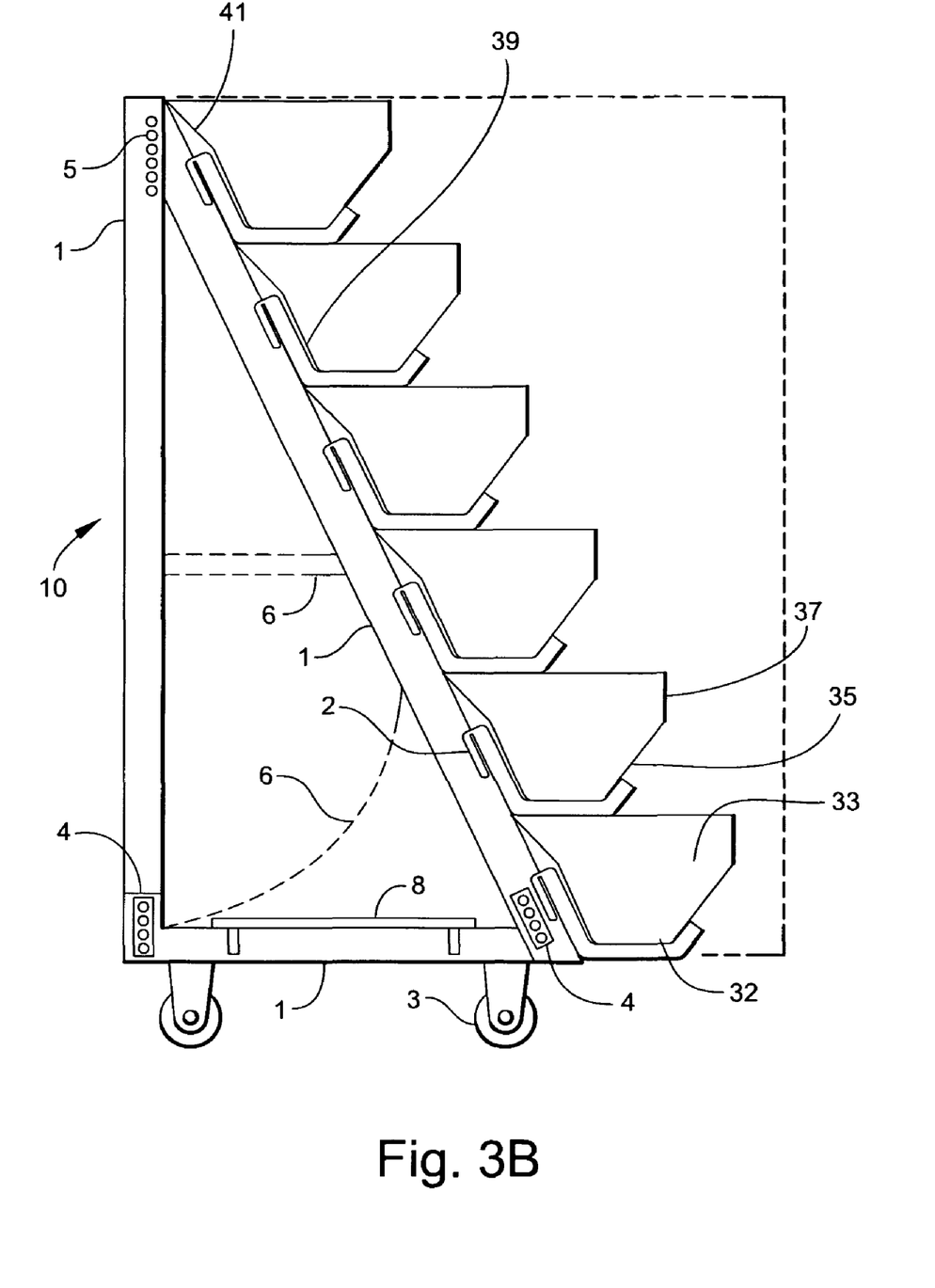
FIG. 3B shows a side view of another alternate embodiment of the present invention.

In another alternate embodiment, shown in FIG. 3B, the at least two growing containers 30 may comprise the base 32, two sides 33, a forward angled front side 35 having a vertical lip 37, and a rearward angled rear side 39 having an angled rear lip 41. Thus water trickling down from an above container 30 may be intercepted by the rear lip 41 and directed down the rear side 39 into the soil of the container 30. These growing containers 30 are sized to be stacked inside of each other when shipped in the disassembled state.

As shown in FIG. 5, the growing containers 30 may be sectionable by means of at least one partition 42 that may be inserted into the interior of the growing containers 30.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereof.

What is claimed is:

1. A kit for gardening comprising a cart comprising a base structure, at least one vertical support attached to a rear end of the base structure, at least one diagonal support attached between a front end of the base structure and a top end of the vertical support, said diagonal support further comprising a plurality of bracket receiving slots; at least two growing containers, each growing container comprising a base, two sides, a forward angled front side having a vertical lip that extends between ½ to ¼ the height of the growing containers, and a rearward angled rear side having an angled rear lip that extends between ½ to ¼ the height of the growing containers, capable of holding soil or other plant material, said base having at least one water drainage aperture; and a structure for attaching the at least two growing containers to the diagonal supports of the cart.

2. The kit according claim 1 wherein the at least two growing containers are all the same size.

3. The kit according to claim 1 wherein the at least two growing containers are different sizes.

4. A device for gardening comprising a cart comprising a base structure, at least one vertical support attached to a rear end of the base structure, at least one diagonal support attached between a front end of the base structure and a top end of the vertical support, said diagonal support further comprising a plurality of bracket receiving slots; at least two growing containers, each growing container comprising a base, two sides, a forward angled front side having a vertical lip, and a rearward angled rear side having an angled rear lip, capable of holding soil or other plant material, said base having at least one water drainage aperture; and a structure for attaching the at least two growing containers to the diagonal supports of the cart.

5. The device according to claim 4 wherein the at least two growing containers are all the same size.

6. The device according to claim 4 wherein the at least two growing containers are different sizes.

* * * * *